United States Patent Office 3,202,571
Patented Aug. 24, 1965

3,202,571
NEW FUNGICIDAL COMPOUNDS
Krijn van den Boogaart, Vlaardingen, Netherlands, assignor to Fabriek Van Chemische Producten Vondelingenplaat N.V., Rotterdam, Netherlands, a corporation of the Netherlands
No Drawing. Filed Dec. 29, 1959, Ser. No. 862,468
Claims priority, application Netherlands, Apr. 13, 1959, 238,098
8 Claims. (Cl. 167—22)

The invention relates to a process for the preparation of new fungicidal compounds having the formula

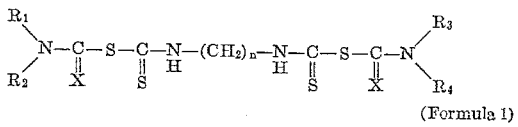

(Formula 1)

in which $R_1$, $R_2$, $R_3$ and $R_4$ represent the same or different alkyl radicals with 1–10 carbon atoms, X an oxygen or a sulphur atom, and $n$ an integer with a value of 2 or 3.

When X stands for a sulphur atom, these compounds are of the type of the thiuram monosulphides, which have the group with the formula

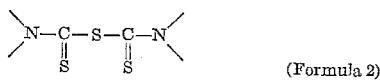

(Formula 2)

as the characteristic grouping.

Compounds of this type are known as fungicides. Thus, in the communications from the Agricultural University and the Government Research Stations at Ghent, 1956, XXI, No. 3, pages 324 and 325, ethylene thiuram monosulphide and polyethylene thiuram monosulphide are mentioned as fungicides. The oxidation of disodium-ethylenebisdithiocarbamate in a liquid solution to form ethylene thiuram monosulphide is also mentioned in the U.S. patent specification No. 2,766,274. According to the French patent specification No. 1,149,577 a fungicide is prepared by desulphurizing a polymeric bisthiuram disulphide by the action of a cyanide of an alkali metal. In this process polymers with a lower sulphur content than the starting products are formed.

A group of compounds related to the thiuram monosulphides is formed by the thiuram disulphides, which have the group with the formula

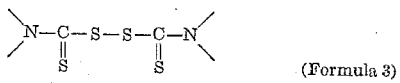

(Formula 3)

as the characteristic grouping. These compounds too are known fungicides. Thus it is, for instance, known from the French patent specification No. 1,091,317 to oxidize alkylenebisdithiocarbamic acid derivatives to form polybisthiuram disulphides. According to the Dutch patent specification No. 89,347 fungicidal preparations are obtained by mixing mixed thiuram disulphides, e.g. bis-(dimethyldithiocarbamyl)ethylenebisdithiocarbamate, obtained by oxidation of a mixture of an alkylenebisthiocarbamic acid or a salt thereof and a dithiocarbamic acid of a salt thereof, with fillers or dissolving them in solvents, to which emulsifiers and dispersing agents and the like may be added.

On the whole the fungicidal action of thiuram disulphides is greater than that of the corresponding thiuram monosulphides, as appears, for instance, from the Table I below, in which the $LD_{50}$ values of various known compounds are mentioned, which were found in spore germination tests on *Fusarium culmorum*, cherry juice being used as a stimulant.

TABLE I

| Compound: | $LD_{50}$, parts by weight per million |
|---|---|
| (a) Polyethylene thiuram monosulphide | 1.9 |
| (b) Polyethylene thiuram disulphide | 0.5 |
| (c) Tetramethyl thiuram monosulphide | 30.0 |
| (d) Tetramethyl thiuram disulpihde | 2.0 |
| (e) Mixture of (a) and (c) (1:1) | 8.0 |

When in the same way the compound according to the application with the formula according to Formula 1, in which $R_1=R_2=R_3=R_4=$methyl, X=sulphur, and $n=2$, i.e. bis(dimethylthiocarbamyl) ethylenebisdithiocarbamate, is compared with the corresponding disulphide, the surprising discovery is made that the monosulphide is the more active of the two.

TABLE II

| Compound: | $LD_{50}$, parts by weight per million |
|---|---|
| Bis(dimethylthiocarbamyl) ethylenebisdithiocarbamate | 1.4 |
| Bis(diethylthiocarbamyl) ethylenebisdithiocarbamate | 0.9 |
| Bis(dimethyldithiocarbamyl) ethylenebisdithiobamate according to Dutch patent specification No. 89,347 | 2.8 |

A second unexpected effect of the compounds according to the invention is their effective action in fighting apple mildew (*Podosphaera leucotricha*). This applies both to the primary or bud infections and to the secondary or leaf infections.

In general the thiuram disulphides have an effective scab-destroying action, accompanied by only a limited additional action against the secondary mildew infections.

For fighting the primary infections by apple mildew, however, no adequate means have yet been found besides the means described in the French patent specification No. 1,180,776. The effective action of the compounds according to the said patent specification may be ascribed to the presence in the molecule of a quaternary ammonium radical with a long alkyl radical. Owing to this, the compounds have good surface activity and consequently are able to penetrate in places which are not very well accessible.

The compounds according to the invention do not posses this grouping. As appears, however, from the test described in Example IX below, the compounds according to the invention yet have an excellent mildew-destroying action, especially for primary infections. Moreover, in Example X a test is described with respect to the combating of apple scab (*Venturia inaequalis*) in which one of the known fungicidal agents, Zineb (zinc ethylenebisdithiocarbamate), is used for purposes of comparison. From this test a distinctly superior scab-destroying action of the new fungicide becomes apparent.

The preparation of the new compounds according to the present application takes place by a method known per se for this type of compounds.

Thus, a compound having the formula

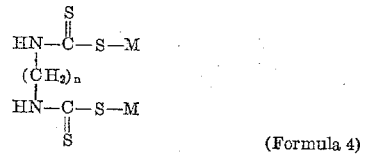

(Formula 4)

in which the symbol M stands for a monovalent cation or two symbols M together stand for a bivalent cation, can be converted with one or two dialkyl(thio)carbamyl chlorides with the formulae

(Formula 5)

or

(Formula 6)

Another process is the conversion of a mixture of molar quantities of polyethylene thiuram disulphide and tetraalkyl thiuram disulphide with an alkali metal cyanide.

Furthermore the compounds according to the invention can be obtained when bis(dialkyldithiocarbamyl)ethylenebisdithiocarbamate is reacted with an alkali metal cyanide.

Finally it is possible to treat a mixture of sodiumdialkyldithiocarbamate and disodiumethylenebisdithiocarbamate or disodiumpropylenebisdithiocarbamate respectively in a molar ratio of 2:1 with a quantity of phosgene which is equimolecular with respect to the first mentioned compound.

According to the three last mentioned processes mixtures are obtained of which the compounds according to the present application form constituents. In view of this the mixtures are less active than the pure compounds, as is illustrated further in Example I.

It is preferred to prepare compounds with the formula according to Formula 1, in which all symbols R stand for a methyl or an ethyl radical and $n=2$.

The compounds obtained according to the invention can be processed to form fungicidal preparations by mixing them with solid or liquid inert diluents said, if desired, auxiliary substances, such as dispersing agents and the like. They may also be mixed with other pesticides, provided they are not liable to react therewith.

The following examples are intended to illustrate but not to restrict the invention.

Example I $LD_{50}$ values of compounds according to the present application, having the formula according to Formula 1 (in parts by weight per million), found in spore germination tests with cherry juice as stimulant and carried out with *Fusarium culmorum*.

| | | | | $LD_{50}$ |
|---|---|---|---|---|
| $R_1=R_2=R_3=R_4=$Methyl | $X=S$ | $n=2$ | 1.4 | (Example II). |
| Ethyl | $X=S$ | $n=2$ | 0.9 | |
| Isopropyl | $X=S$ | $n=2$ | 1.25 | |
| Butyl | $X=S$ | $n=2$ | 1.6 | |
| Isobutyl | $X=S$ | $n=2$ | 1.5 | |
| Nonyl | $X=S$ | $n=2$ | 33 | |
| $R_1=R_1 R_3=R_4=$Methyl | $X=S$ | $n=3$ | 17 | |
| Ethyl | $X=S$ | $n=3$ | 80 | (Example VI). |
| $R_1=R_2=R_3=R_4=$Methyl | $X=O$ | $n=2$ | 0.5 | (Example VII). |
| $R_1=R_2=$Methyl $R_3=R_4=$Ethyl | $X=S$ | $n=2$ | 1.1 | (Example VIII). |

In the Examples III, IV and V preparation methods are mentioned which lead to mixtures of which the compounds according to Formula 1 form a constituent. The $LD_{50}$ values of these mixtures accordingly are higher than the $LD_{50}$ value of the corresponding compound according to Formula 1 (cf. the above table).

| | $LD_{50}$ |
|---|---|
| Mixture prepared according to Example III | 5 |
| Mixture prepared according to Example IV | 30 |
| Mixture prepared according to Example V | 3.5 |

Example II 83 g. of 99% trimethylammonium salt of ethylenebisdithiocarbamate (0.25 mole) are stirred with 250 cc. of ethanol, upon which the mixture is heated to 40° C. In the course of 45 minutes 62 g. of molten dimethylthiocarbamyl chloride (0.5 mole) are added dropwise. The temperature is kept at 40–45° C. A yellow precipitate is formed, which is first washed with ethanol and then stirred with water, in order to remove the trimethylammonium chloride. After drying, 48 g. of bis(dimethylthiocarbamyl)ethylenebisdithiocarbamate is obtained.

Analysis (sulphur content): Calculated 49.74%, found 49.76%. Nitrogen content: Calculated 14.51%, found 14.33%.

In an analogous way bis(diethylthiocarbamyl) ethylenebisdithiocarbamate can be formed. Instead of the trimethylammonium salt of ethylenebisdithiocarbamate the disodium salt or the diammonium salt can also be used, while methanol and isopropanol, water or dimethylformamide can also be used as solvents.

Example III 105 g. of polyethylene thiuram disulphide (0.5 mole) and 60 g. of tetramethyl thiuram disulphide (0.5 mole) were stirred with a mixture of 500 ml. of water and 150 ml. of acetone. To the suspension a solution of 60 g. of NaCN (1.22 moles) in 150 ml. of water was added dropwise. By external cooling the temperature was kept at 25° C. The white suspension turned yellow-brown.

Yield of dry product: 122 g. Yield: 63.2%.

Sulphur content: Found 47.5%, calculated 49.7%.

Example IV 74 g. (0.165 mole) of bis(dimethyldithiocarbamyl)ethylenebisdithiocarbamate (prepared according to Dutch patent specification No. 89,347) were stirred with a mixture of 250 ml. of water and 75 ml. of acetone. To the suspension a solution of 30 g. of NaCN (0.6 mole) in 75 ml. of water was added dropwise. By external cooling the temperature was kept at 25° C. Yield: quantitative.

Sulphur content: Found 47.0%, calculated 49.7%.

Example V

In a three-necked flask of 1.5 l. were placed 80 ml. of 77.1% diammoniumethylenebisdithiocarbamate solution (0.25 mole), 142.5 ml. of 48.4% ammoniumdimethyldithiocarbamate solution (0.5 mole), 20 g. of sodium bicarbonate, and 250 ml. of water.

At 0–5° C. phosgene was passed into this mixture until the pH decreased to about 4, when a yellow product separated off.

Yield of dry product _____ g__ 37
Sulphur content:
  Found _____ percent__ 46.5
  Calculated _____ do____ 49.7

Example VI

Preparation of the compound according to Formula 1, in which $R_1=R_2=R_3=R_4=$ethyl, $X=$sulphur and $n=3$.

91 g. of 94.7% trimethylammonium salt of propylenebisdithiocarbamic acid (0.25 mole) were stirred with 250 ml. of isopropanol and subsequently heated to 40° C. In 45 minutes 76 g. of diethylthiocarbamyl chloride were added dropwise. A clear solution of yellow-green colour was obtained. By cooling, the reaction temperature was kept at 40–45° C. The isopropanol was evaporated in vacuo below 40° C. The remaining oil was stirred with water and subsequently dried. Yield: 66.7%.

Example VII

Preparation of the compound according to Formula 1, in which $R_1=R_2=R_3=R_4=$methyl, $X=$oxygen, and $n=2$.

89 g. of 92.8% trimethylammoniumethylenebisdithiocarbamate (0.25 mole) were stirred with 250 ml. of isopropanol. In 45 minutes 54 g. of molten dimethylcarbamyl chloride were added dropwise at 40° C. A yellow product gradually formed. This was filtered off, washed with water, and dried in vacuo at 40° C. Yield: 36%.

Example VIII

Preparation of a mixture of which the compound according to Formula 1, in which $R_1=R_2=$methyl, $R_3=R_4=$ethyl, X=sulphur and $n=2$, forms a constituent. 711 g. of 63.3% diammoniumethylenebisdithiocarbamate solution (1.83 moles) were mixed with 920 ml. of methanol. In 45 minutes 502 g. (3.65 moles) of a mixture of dimethylthiocarbamyl chloride and diethylthiocarbamyl chloride (molar ratio 1:1) were added dropwise at 20–25° C. First a red-coloured solution was formed, from which later a yellow crystalline product separated off. The product was filtered off, washed first with methanol and then with water, and dried in vacuo at 40° C. Yield: 34.6%.

Example IX

According to this example bis(dimethylthiocarbamyl)-ethylenebisdithiocarbamate in a concentration of 0.25% by weight was compared with powdered sulphur in a concentration of 0.3% by weight and Karathane (4,6-dinitro 2-(1'-methylheptyl)phenyl crotonate in a concentration of 0.1%.

Of all the trees involved in the test, on July 15–18, 1958, the number of distinct mildewed shoots (primary infection) was counted, while also 100 leaves of each tree were examined for secondary infection.

| | Average number of distinct mildewed shoots per tree | Average secondary infection in percent leaf area per tree |
|---|---|---|
| Powdered sulphur | 15.6 | 33.6 |
| Karathane | 9.4 | 31.3 |
| Bis(dimethylthiocarbamyl)ethylenebisdithiocarbamate | 4.2 | 18.3 |

Example X

During a test for fighting scab (*Venturia inaequalis*) on apple trees, owing to the bad weather conditions in the early part of the test the spraying was insufficient, in consequence of which the scab infection was very heavy. The bis(dimethylthiocarbamyl)ethylenebisdithiocarbamate obtained according to Example II was compared with a standard product of zinc ethylenebisdithiocarbamate (Zineb) as 70% spraying powder. The product was sprayed in the form of a 0.25% suspension. When on June 18, 1958 the results were ascertained, the formation of scab on the leaves in percent of the leaf area was found to be 10.1% upon application of the compound according to Example II and 15.5% for Zineb.

What I claim is:

1. A compound having the formula

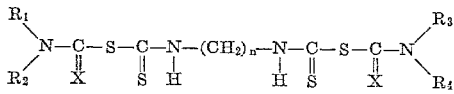

in which $R_1$, $R_2$, $R_3$ and $R_4$ represent alkyl with 1 to 10 carbon atoms, X represents an atom selected from the group consisting of oxygen and sulphur atoms, and $n$ is an integer with from 2 to 3.

2. A compound having the formula

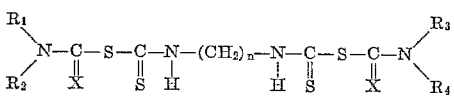

wherein $R_1$, $R_2$, $R_3$ and $R_4$ are selected from the group consisting of methyl and ethyl, X represents an atom selected from the group consisting of oxygen and sulphur atoms and $n=2$.

3. A composition of matter having fungicidal properties which comprises as an active fungicidal ingredient, at least one compound having the formula

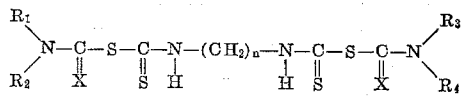

in which $R_1$, $R_2$, $R_3$ and $R_4$ represent alkyl with 1 to 10 carbon atoms, X represents an atom selected from the group consisting of oxygen and sulphur atoms, and $n$ is an integer with from 2 to 3, and a wetting agent.

4. A method of controlling fungi on materials subject to attack by fungi comprising treating said material with a fungicide comprising a compound having the formula

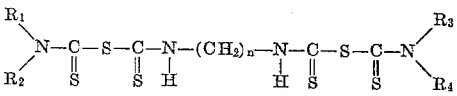

wherein $R_1$, $R_2$, $R_3$ and $R_4$ represent lower alkyl and $n$ is an integer from 2 to 3.

5. A composition of matter having fungicidal properties containing as an active fungicidal ingredient at least one compound having the formula

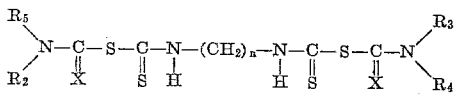

in which $R_1$, $R_2$, $R_3$ and $R_4$ represent alkyl having from 1 to 10 carbon atoms, X represents an atom selected from the group consisting of oxygen and sulfur atoms, and $n$ is an integer from 2 to 3, together with a carrier.

6. A composition of matter having fungicidal properties containing as an active fungicidal ingredient at least one compound having the formula

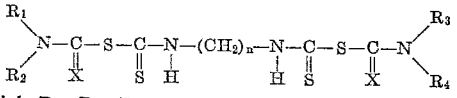

in which $R_1$, $R_2$, $R_3$ and $R_4$ are selected from the group consisting of methyl and ethyl, X represents an atom selected from the group consisting of oxygen and sulfur atoms and $n=2$, together with a carrier.

7. A method of controlling fungi on materials subject to attack by fungi, comprising treating said material with a fungicide comprising at least one compound having the formula

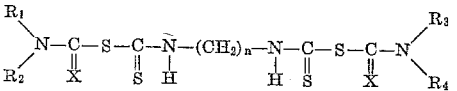

in which $R_1$, $R_2$, $R_3$ and $R_4$ represent alkyl having from 1 to 10 carbon atoms, X represents an atom selected from the group consisting of oxygen and sulfur atoms, and $n$ is an integer from 2 to 3.

8. A method of controlling fungi on materials subject to attack by fungi, comprising treating said material with a fungicide comprising at least one compound having the formula

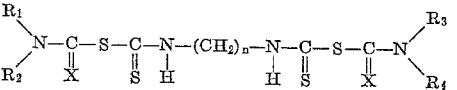

in which $R_1$, $R_2$, $R_3$ and $R_4$ are selected from the group consisting of methyl and ethyl, X represents an atom selected from the group consisting of oxygen and sulfur atoms and $n=2$.

References Cited by the Examiner

UNITED STATES PATENTS

| 1,682,920 | 9/28 | Maximoff | 260—567 |
| 2,045,275 | 6/36 | Leaper. | |
| 2,048,043 | 7/36 | Williams et al. | 260—567 |

(Other references on following page)

UNITED STATES PATENTS

| | | | |
|---|---|---|---|
| 2,171,420 | 8/39 | Williams | 260—455 |
| 2,384,577 | 9/45 | Thomas | 260—455 |
| 2,524,081 | 10/50 | Ritter | 260—567 X |
| 2,561,208 | 7/51 | Kirk | 260—567 X |
| 2,766,274 | 10/56 | Flenner | 260—567 X |
| 2,796,376 | 6/57 | Williams et al. | 260—455 X |
| 2,837,458 | 6/58 | Coleman | 260—567 |
| 2,845,453 | 7/58 | Brooks | 260—567 X |
| 2,852,361 | 9/58 | Lesslie | 260—455 X |
| 2,859,246 | 11/58 | Martin et al. | 260—567 |
| 2,864,737 | 12/58 | Fields et al. | 167—22 |
| 2,906,662 | 9/59 | Carlson | 167—22 |
| 2,927,899 | 3/60 | Goldwasser | 260—567 |
| 2,943,972 | 7/60 | van der Kirk | 260—455 X |
| 2,929,846 | 3/60 | Gates et al. | 260—567 |
| 3,067,090 | 12/62 | Groningen | 260—567 |

FOREIGN PATENTS 89,347   9/58   Netherlands.

JULIAN S. LEVITT, *Primary Examiner*.

CHARLES B. PARKER, MORRIS O. WOLK, LEWIS GOTTS, *Examiners*.